L. J. AND D. C. PANETTI.
WEEDING TOOL.
APPLICATION FILED JULY 18, 1918.
1,340,624.
Patented May 18, 1920.
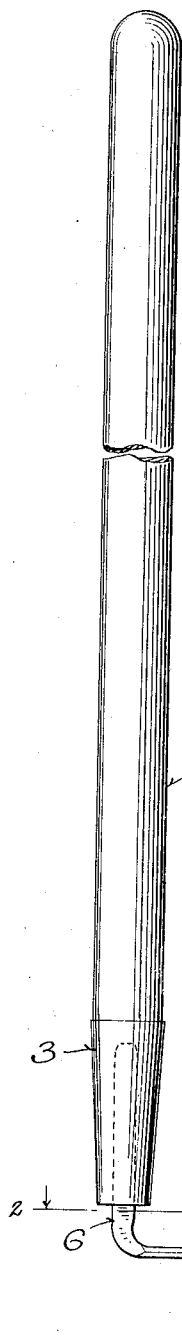
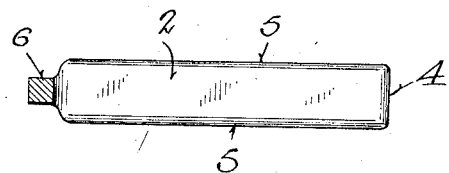
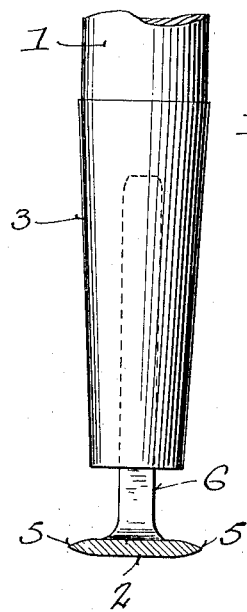
Inventor
Louis J. Panetti
David C. Panetti
By Ensign & Wheeler
Attorneys

UNITED STATES PATENT OFFICE.

LOUIS J. PANETTI AND DAVID C. PANETTI, OF JUMP RIVER, WISCONSIN.

WEEDING-TOOL.

1,340,624.  Specification of Letters Patent.  Patented May 18, 1920.

Application filed July 18, 1918. Serial No. 245,496.

*To all whom it may concern:*

Be it known that we, LOUIS J. PANETTI and DAVID C. PANETTI, citizens of the United States, residing at Jump River, county of Taylor, and State of Wisconsin, have invented new and useful Improvements in Weeding-Tools, of which the following is a specification.

Our invention relates to improvements in weeding tools or hoes, and the same is explained by reference to the accompanying drawing, in which—

Figure 1 represents an elevation.

Fig. 2 is a section, on line 2—2 of Fig. 1, and,

Fig. 3 is a section, on line 3—3 of Fig. 1.

Like parts are identified by the same reference numerals throughout the several views.

1 represents a wooden handle of ordinary construction, and the same is fastened to the weeding blade 2, in the ordinary manner by the ferrule 3. The blade 2 is provided at one end with a cutting edge 4, and upon the upper and lower sides with edges 5, 5. 6 represents the shank of the device. The cutting blade 2 and shank 6 are preferably formed of steel or iron in the ordinary way, the blade being considerably thicker at its center than at its edges.

The edges 4, and 5, 5 are such that the tool is adapted to penetrate the surface of the soil when hard, whereby the same is readily broken up and pulverized; while if the soil is very hard it can be easily broken by forcing the end 4 into the same, when it is broken off and pulverized by bearing downwardly or upwardly upon the handle 1.

Having thus described our invention what we claim as new and desire to secure by Letters Patent, is:

As a new manufacture, a weeder comprising a narrow, rectangular cutting blade having cutting edges upon its two parallel sides, and a cutter edge across one end, a shank at the opposite end, said shank being formed at right angles to said blade, said blade having a comparatively thick center, and a handle in which the shank is inserted.

In testimony whereof we affix our signatures in the presence of two witnesses.

LOUIS J. PANETTI.
DAVID C. PANETTI.

Witnesses:
DANIEL C. BOECKLER,
HENRY A. BOECKLER.